（12）United States Patent
Hu (10) Patent No.: US 9,065,343 B2
(45) Date of Patent: Jun. 23, 2015

(54) RESONANT CONVERTER WITH AUXILIARY RESONANT COMPONENTS AND HOLDUP TIME CONTROL CIRCUITRY

(71) Applicant: Power-One, Inc., Camarillo, CA (US)

(72) Inventor: Gordon Zongbo Hu, Shenzhen (CN)

(73) Assignee: PAI Capital LLC, San Jose, CA (US)

( * ) Notice: Subject to any disclaimer, the term of this patent is extended or adjusted under 35 U.S.C. 154(b) by 260 days.

(21) Appl. No.: 13/739,862

(22) Filed: Jan. 11, 2013

(65) Prior Publication Data

US 2013/0194831 A1  Aug. 1, 2013

Related U.S. Application Data

(60) Provisional application No. 61/586,541, filed on Jan. 13, 2012.

(51) Int. Cl.
*H02M 3/335* (2006.01)
*H02M 1/32* (2007.01)
*H02M 1/00* (2007.01)

(52) U.S. Cl.
CPC ............ *H02M 3/33507* (2013.01); *H02M 1/32* (2013.01); *H02M 2001/325* (2013.01); *H02M 3/33569* (2013.01); *Y02B 70/1433* (2013.01); *H02M 2001/0058* (2013.01); *Y02B 70/1491* (2013.01)

(58) Field of Classification Search
USPC ............. 363/17–26, 50–56.12; 323/299, 301, 323/302
See application file for complete search history.

(56) References Cited

U.S. PATENT DOCUMENTS

| | | | |
|---|---|---|---|
| 5,177,675 A | 1/1993 | Archer | |
| 5,388,040 A | 2/1995 | Hall | |
| 6,538,906 B1 | 3/2003 | Ke et al. | |
| 7,660,133 B1 | 2/2010 | Hwang et al. | |
| 7,692,937 B2 | 4/2010 | Zeng et al. | |
| 7,729,143 B2 | 6/2010 | Lin et al. | |
| 8,558,517 B2 * | 10/2013 | Liquicia et al. | 323/224 |
| 8,736,240 B2 * | 5/2014 | Liu et al. | 323/266 |
| 2009/0244944 A1 * | 10/2009 | Jang et al. | 363/126 |
| 2009/0290384 A1 * | 11/2009 | Jungreis | 363/17 |
| 2010/0182803 A1 * | 7/2010 | Nan et al. | 363/21.02 |

FOREIGN PATENT DOCUMENTS

| | | |
|---|---|---|
| JP | 05161352 A | 6/1993 |
| JP | 09047021 A | 2/1997 |

OTHER PUBLICATIONS

International Search Report in International Application No. PCT/US2013/021207, mailed Apr. 29, 2013, 9 pp.

* cited by examiner

*Primary Examiner* — Jessica Han (74) *Attorney, Agent, or Firm* — Patterson Intellectual Property Law, P.C.; Mark J. Patterson; Gary L. Montle (57) ABSTRACT

A resonant power converter is provided with auxiliary circuit branches and control circuitry for switchably coupling the auxiliary branches to resonant circuit components during holdup times. Auxiliary branches are coupled in parallel with any one or more of a resonant inductor, a resonant capacitor, and a magnetizing inductive winding via respective switches. When a holdup time condition is detected in accordance with, for example, a drop in the mains line voltage, the switches are controlled to adjust the corresponding inductance or capacitance for the duration of the holdup time condition or otherwise for a predetermined duration. The power converter in normal operation is configured for high efficiency and in a holdup time operation is configured to produce sufficient holdup time.

20 Claims, 9 Drawing Sheets

RESONANT CONVERTER WITH AUXILIARY RESONANT COMPONENTS AND HOLDUP TIME CONTROL CIRCUITRY

CROSS-REFERENCES TO RELATED APPLICATIONS

This application claims benefit of the following patent application which is hereby incorporated by reference: U.S. Provisional Patent Application No. 61/586,541, filed Jan. 13, 2012.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND OF THE INVENTION

The present invention relates generally to resonant power converters. More particularly, the present invention relates to gain enhancement techniques in resonant power converters through the use of auxiliary components and associated control circuitry.

Resonant converters (e.g., LLC converters) have become a popular topology in power conversion applications and can generally meet or exceed high efficiency requirements due to soft switching. However, achieving better performance (e.g., higher efficiency) is difficult because any combination of requirements for a holdup time, peak power, and wide input range regulation must be concurrently satisfied. In other words, any solution which may be provided to meet the requirements for holdup time, peak power, and/or wide regulation range, will generally have undesirable side effects with respect to the efficiency of the converter. As a consequence, the key parameters in resonant converters are designed to fashion a compromise between better performance and sufficient holdup time, peak power, and/or wide input range regulation.

Generally stated, a holdup time requirement for a converter is a minimum period of time for which a threshold power output must be maintained after, e.g., an input power failure.

As one example in the case of LLC converters, better efficiency may be obtained with larger magnetizing inductance in the power transformer because magnetizing current can accordingly be reduced. This is beneficial with respect to semiconductor conduction losses on the primary side of the transformer.

Alternatively, a longer holdup time can be realized with smaller magnetizing inductance in the power transformer according to the gain curve of the LLC converter. Eventually, the key parameters in the LLC converter are a compromise between high efficiency and a required minimum holdup time.

It would be desirable to provide a resonant converter design that supported higher efficiency by optimizing the key parameters (e.g., resonant parameters) of the resonant converter while further allowing for sufficient holdup time.

BRIEF SUMMARY OF THE INVENTION

A resonant converter in accordance with the present invention is designed to controllably adjust one or more key parameters (e.g., resonant parameters) from a first value to a second value only during a holdup time period so as to realize the minimum holdup time requirement, and to return the parameters to the first value when the holdup time period is not in effect so as to provide higher efficiency in the converter. In other words, a particular control mode for a resonant converter of the present invention satisfies the holdup time requirement without negatively affecting the high efficiency of the converter because it only operates in the control mode during the holdup time period.

According to the gain curve of the LLC converter, an increase in values for any one or more of a resonant capacitor, a resonant inductor and/or the magnetizing inductance of the power transformer may sufficiently enhance the holdup time of the converter.

DETAILED DESCRIPTION OF THE INVENTION

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The term "coupled" means at least either a direct electrical connection between the connected items or an indirect connection through one or more passive or active intermediary devices. The term "circuit" means at least either a single component or a multiplicity of components, either active and/or passive, that are coupled together to provide a desired function. The term "signal" as used herein may include any meanings as may be understood by those of ordinary skill in the art, including at least an electric or magnetic representation of current, voltage, charge, temperature, data or a state of one or more memory locations as expressed on one or more transmission mediums, and generally capable of being transmitted, received, stored, compared, combined or otherwise manipulated in any equivalent manner.

The terms "switching element" and "switch" may be used interchangeably and may refer herein to at least: a variety of transistors as known in the art (including but not limited to FET, BJT, IGBT, JFET, etc.), a switching diode, a silicon controlled rectifier (SCR), a diode for alternating current (DIAC), a triode for alternating current (TRIAC), a mechanical single pole/double pole switch (SPDT), or electrical, solid state or reed relays. Where either a field effect transistor (FET) or a bipolar junction transistor (BJT) may be employed as an embodiment of a transistor, the scope of the terms "gate," "drain," and "source" includes "base," "collector," and "emitter," respectively, and vice-versa.

The terms "power converter" and "converter" unless otherwise defined with respect to a particular element may be used interchangeably herein and with reference to at least DC-DC, DC-AC, AC-DC, buck, buck-boost, boost, half-bridge, full-bridge, H-bridge or various other forms of power conversion or inversion as known to one of skill in the art.

Terms such as "providing," "processing," "supplying," "determining," "calculating" or the like may refer at least to an action of a computer system, computer program, signal processor, logic or alternative analog or digital electronic device that may be transformative of signals represented as physical quantities, whether automatically or manually initiated.

The terms "controller," "control circuit" and "control circuitry" as used herein may refer to a processor-readable and non-transitory memory medium such as a general microprocessor, application specific integrated circuit (ASIC), microcontroller, or the like as may be designed and programmed with instructions effective to cause specific functions as further defined herein to be performed upon execution by a processing unit, either alone or in combination with a field programmable gate array or various alternative blocks of discrete circuitry as known in the art.

Referring generally to FIGS. 1-13, various embodiments of a resonant converter are described herein with auxiliary resonant components and control circuitry for controllably adjusting the resonant characteristics of the converter during a holdup time period. Where the various figures may describe embodiments sharing various common elements and features with other embodiments, similar elements and features are given the same reference numerals and redundant description thereof may be omitted below.

Figure 1:
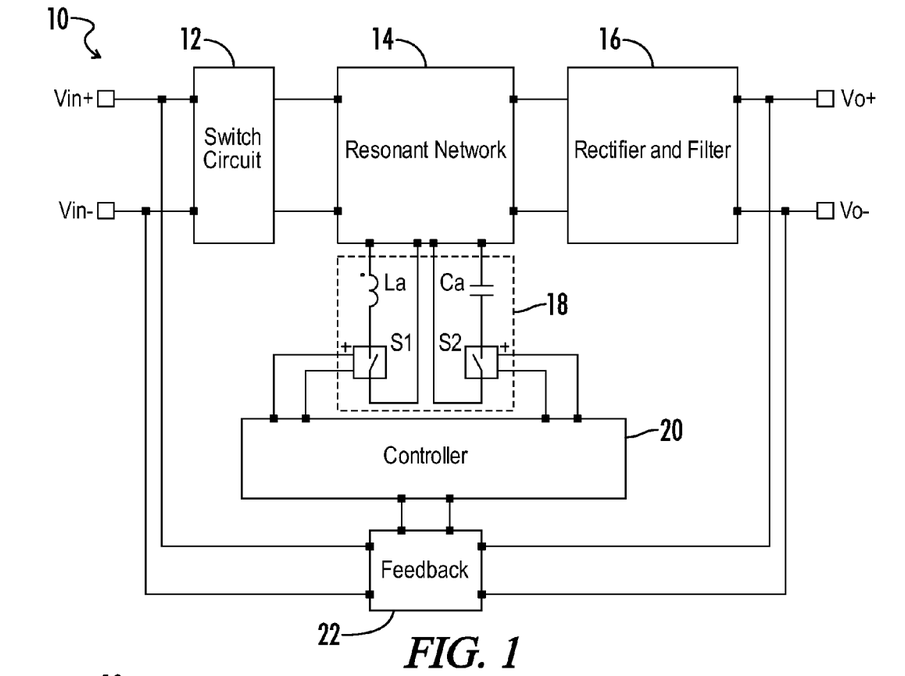
FIG. 1 is a block diagram representing an exemplary resonant converter according to the present invention.

Referring to FIG. 1, an exemplary resonant converter 10 of the present invention includes a switch circuit 12 which may generally define a switching power converter stage coupled to input power terminals Vin+, Vin−. A resonant network 14 is coupled to an output end of the switch circuit 12. A rectifier and filter circuit 16 is coupled to the resonant network 14 and is further coupled on an output end to output power terminals Vo+, Vo−. An auxiliary resonant circuit 18 is provided which includes one or more auxiliary resonant components which are available to be controllably applied across respective resonant components of the resonant network 14. A control circuit 20 provides control signals to enable the application of the auxiliary resonant components during, e.g., a holdup time period, which may be determined based on input signals from a feedback circuit 22.

Figure 2:
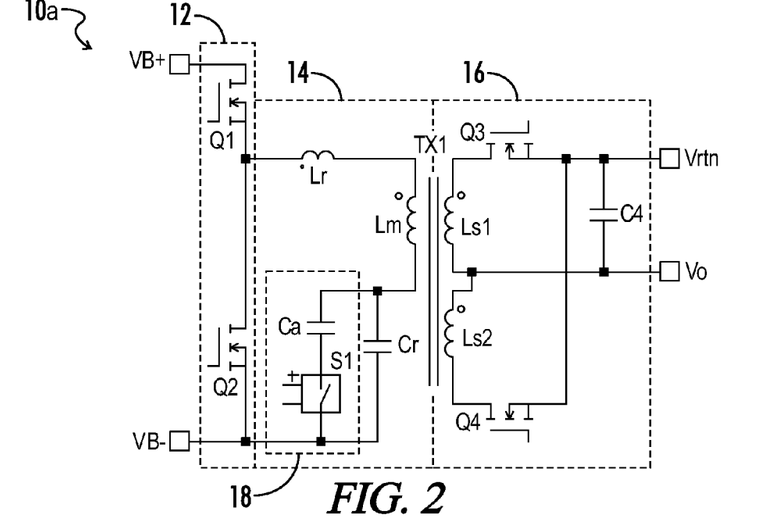
FIG. 2 is a circuit block diagram representing an embodiment of the resonant converter of FIG. 1 having a half-bridge switching converter topology and wherein an auxiliary resonant capacitance is controllably applied.
Figure 3:
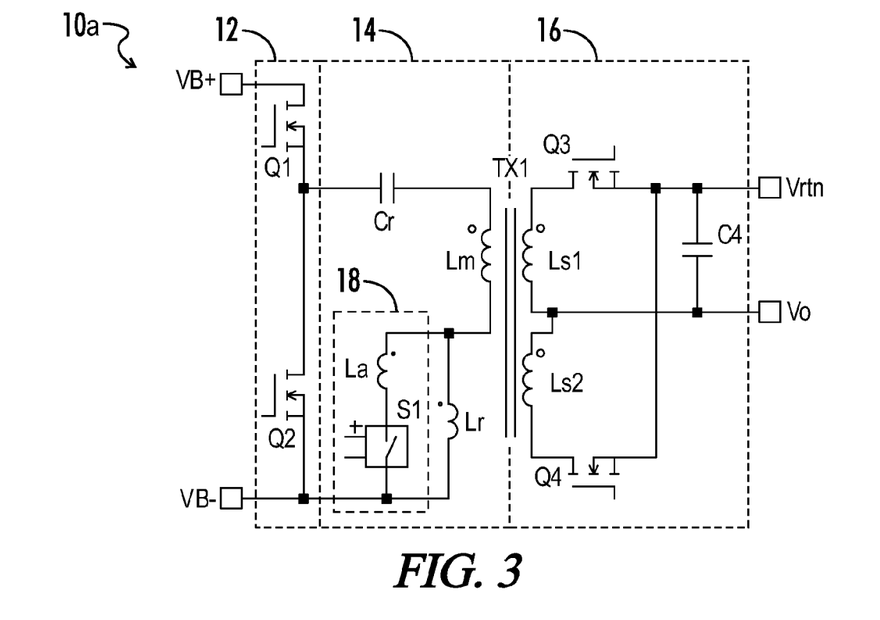
FIG. 3 is a circuit block diagram representing an embodiment of the resonant converter of FIG. 1 having a half-bridge switching converter topology and wherein an auxiliary resonant inductance is controllably applied.
Figure 4:
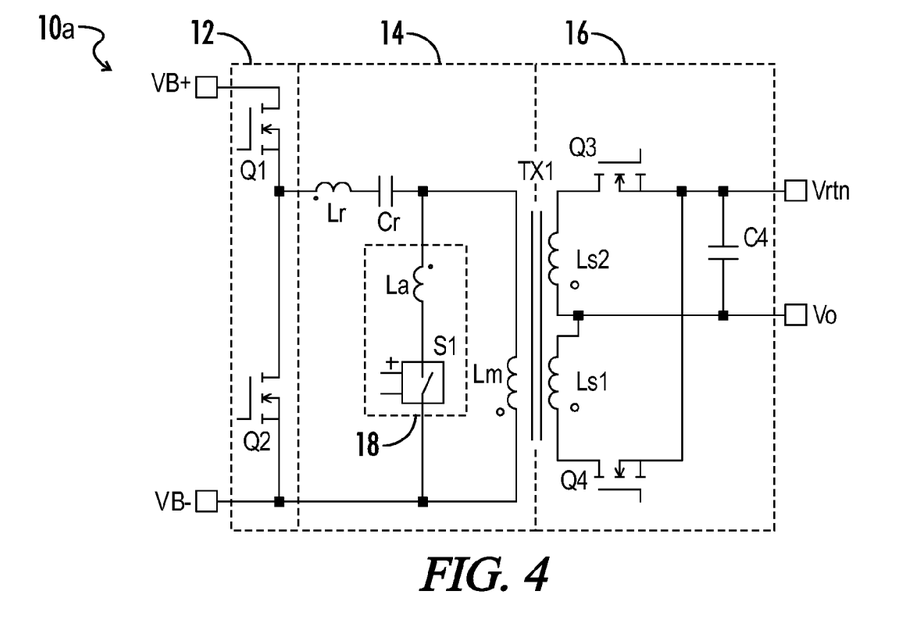
FIG. 4 is a circuit block diagram representing an embodiment of the resonant converter of FIG. 1 having a half-bridge switching converter topology and wherein an auxiliary magnetizing inductance is controllably applied with respect to the magnetizing inductance integral to a primary winding in the power transformer.

Referring generally to FIGS. 2-4, various embodiments may be described with respect to different auxiliary components. It may be understood that any one or more of the auxiliary components may be made available in a resonant converter according to the present invention, although the embodiments described herein only make reference to one at a time.

As represented in FIG. 2, an embodiment of a resonant converter 10a of the present invention includes a switch circuit 12 having first and second switches Q1, Q2, respectively, arranged in a half-bridge topology as it is known in the art across first and second power input terminals VB+, VB−. A series resonant circuit 14 includes a resonant inductor Lr having a resonant inductance, a primary winding Lm of power transformer TX1 having a magnetizing inductance, and a resonant capacitor Cr having a resonant capacitance. The series resonant circuit 14 is coupled on a first end to a node between the pair of switches, Q1, Q2, and on a second end to the second (i.e., negative) power input terminal VB−.

A rectifier and filter circuit 16 includes first and second rectifier switches Q3, Q4 coupled to opposing ends of split windings Ls1, Ls2 of a secondary side of the power transformer TX1. The rectifier switches Q3, Q4 are further coupled to a first power output terminal Vrtn, with a center node between the split windings Ls1, Ls2 being coupled to a second power output terminal Vo. An output capacitor C4 is coupled across the power output terminals Vrtn, Vo as a filtering component. The rectifier and filter circuit 16 as represented in FIG. 2 is intended as merely exemplary, and various alternative topologies on the secondary side (i.e., output end) of the power transformer may be apparent to those of skill in the art and within the scope of the present invention.

An auxiliary resonant capacitance branch 18 is provided, with an auxiliary capacitor Ca and a switching element S1 coupled in series across the resonant capacitor Cr. During normal operation of the converter, the switching element S1 may be off so as to disable the auxiliary branch and make the capacitance of the resonant capacitor Cr be the sole resonant capacitance for the circuit 14 (i.e., a first resonant capacitance value). During a holdup time condition, the switching element S1 may be controlled to be turned on very quickly so as to enable the auxiliary branch 18 and apply the auxiliary capacitance from the auxiliary capacitor Ca in parallel with the resonant capacitor Cr, thereby generating an equivalent capacitance (i.e., second resonant capacitance value) which would be increased with respect to the normal (i.e., first) value. According to the gain curve of a typical LLC converter, the holdup time can be enhanced with higher gain due to the higher resonant capacitance.

It may be understood that the values of the resonant capacitor Cr and the auxiliary capacitor Ca may be chosen in accordance with component values for the desired transfer function and behavior of the resonant network for each of the normal and holdup time operating conditions, respectively. An auxiliary branch may not necessarily be limited to a single auxiliary capacitor and/or switching element, and various alternative arrangements may be provided within the scope of the present invention for generating an equivalent capacitance during a holdup time condition.

Further, as alluded to previously, application of the auxiliary branch is not limited to the occurrence of a holdup time condition, and may in various embodiments be provided in accordance with any one or more of a holdup time condition, a peak power condition, and wide range regulation. A feedback circuit 22 may detect either or both of the input to, and output from, the resonant converter 10a, wherein the timing may be determined by the controller 20 for applying the auxiliary branch 18 to the resonant circuit 14. For example, a holdup time condition may be determined in accordance with detection of a loss of power input, or a drop in input power below a predetermined threshold, and the condition may be accordingly programmed to last for a predetermined holdup time period or may be applicable for as long as the input power is determined to be below the threshold value.

As represented in FIG. 3, another embodiment of a resonant converter 10a of the present invention includes substantially the same arrangement as that represented in FIG. 2, except that the auxiliary branch 18 is provided with an auxiliary inductor La and a switching element S1 coupled in series across the resonant inductor Lr. During normal operation of the converter, the switching element S1 may be on so as to enable the auxiliary branch 18 and apply the auxiliary inductance from the auxiliary inductor La in parallel with the resonant inductor Lr, thereby generating an equivalent inductance for the circuit 14 (i.e., a first resonant inductance value).

During a holdup time condition, the switching element S1 may be controlled to be turned off very quickly so as to disable the auxiliary branch and remove the auxiliary inductance from the auxiliary inductor La, thereby generating a second resonant inductance value which would be increased with respect to the normal (i.e., first) value. According to the gain curve of a typical LLC converter, the holdup time can be enhanced with higher gain due to the higher resonant inductance.

It may be understood that the values of the resonant inductor Lr and the auxiliary inductor La may be chosen in accordance with component values for the desired transfer function and behavior of the resonant network for each of the normal and holdup time operating conditions, respectively. An auxiliary branch may not necessarily be limited to a single auxiliary inductor and/or switching element, and various alternative arrangements may be provided within the scope of the present invention for generating appropriate resonant inductance during normal and holdup time operating conditions.

Further, as alluded to previously, application of the auxiliary branch is not limited to the occurrence of a holdup time condition, and may in various embodiments be provided in accordance with any one or more of a holdup time condition, a peak power condition, and wide range regulation. A feedback circuit 22 may detect either or both of the input to and output from the resonant converter 10a, wherein the timing may be determined by the controller for applying the auxiliary branch 18 to the resonant circuit 14. For example, a holdup time condition may be determined in accordance with detection of a loss of power input, or a drop in input power below a predetermined threshold, and the condition may be accordingly programmed to last for a predetermined holdup time period or may be applicable for as long as the input power is determined to be below the threshold value.

As represented in FIG. 4, another embodiment of a resonant converter 10 of the present invention includes substantially the same arrangement as that represented in FIG. 2, except that the auxiliary branch 18 is provided with an auxiliary inductor La and a switching element S1 coupled in series across the magnetizing inductance of the primary winding Lm of the power transformer TX1. During normal operation of the converter, the switching element S1 may be off so as to disable the auxiliary branch 18 and make the magnetizing inductance of the primary winding Lm be the sole magnetizing inductance for the circuit 14 (i.e., a first magnetizing inductance value). During a holdup time condition, the switching element S1 may be controlled to be turned on very quickly so as to enable the auxiliary branch and apply the auxiliary inductance from the auxiliary inductor La in parallel with the primary winding Lm, thereby generating an equivalent magnetizing inductance (i.e., second magnetizing inductance value) which would be decreased with respect to the normal (i.e., first) value. According to the gain curve of a typical LLC converter, the holdup time can be enhanced with higher gain due to the smaller magnetizing inductance.

It may be understood that the values of the magnetizing inductance of the primary winding Lm and the auxiliary inductor La may be chosen in accordance with component values for the desired transfer function and behavior of the resonant network for each of the normal and holdup time operating conditions, respectively. An auxiliary branch may not necessarily be limited to a single auxiliary inductor and/or switching element, and various alternative arrangements may be provided within the scope of the present invention for generating an equivalent magnetizing inductance during a holdup time condition.

Further, as alluded to previously, application of the auxiliary branch is not limited to the occurrence of a holdup time condition, and may in various embodiments be provided in accordance with any one or more of a holdup time condition, a peak power condition, and wide range regulation. A feedback circuit 22 may detect either or both of the input to and output from the resonant converter 10a, wherein the timing may be determined by the controller 20 for applying the auxiliary branch 18 to the resonant circuit 14. For example, a holdup time condition may be determined in accordance with detection of a loss of power input, or a drop in input power below a predetermined threshold, and the condition may be accordingly programmed to last for a predetermined holdup time period or may be applicable for as long as the input power is determined to be below the threshold value.

Figure 5:
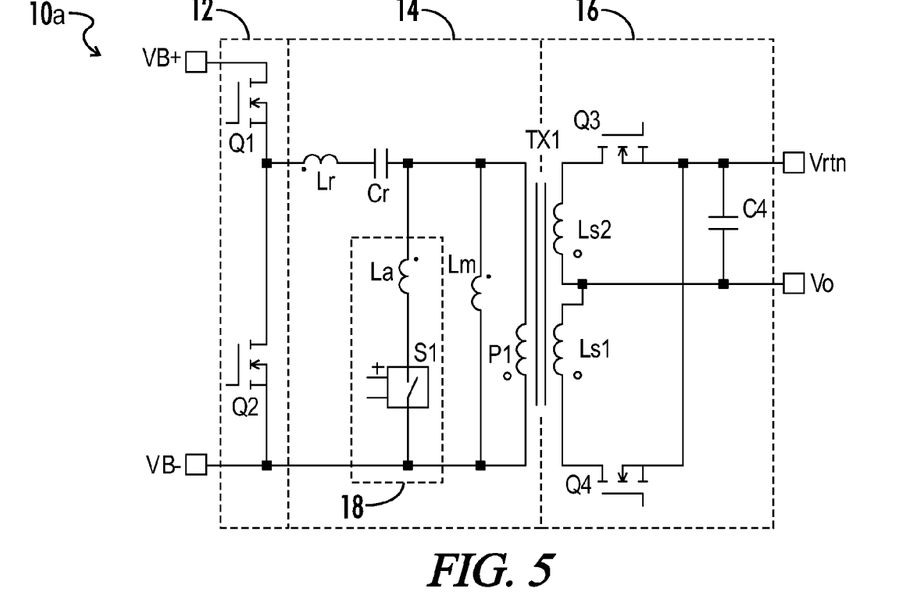
FIG. 5 is a circuit block diagram representing an embodiment of the resonant converter of FIG. 1 having a half-bridge switching converter topology and wherein an auxiliary magnetizing inductance is controllably applied with respect to the magnetizing inductance of a separate magnetizing inductor parallel to the primary winding in the power transformer.

Referring now to FIG. 5, to further improve resonant converter efficiency a separate magnetizing inductor Lm may be used with respect to the primary winding P1 of the power transformer TX1, thereby minimizing core loss. In this case, the power transformer TX1 may be constructed without an air gap, or the parameters of the air gap may reasonably be ignored. An external but smaller core may be used as the magnetizing inductor Lm. Otherwise, application or removal of the auxiliary branch 18 with respect to the magnetizing inductor Lm may be substantially the same as the process described above with respect to FIG. 4.

Figure 6:
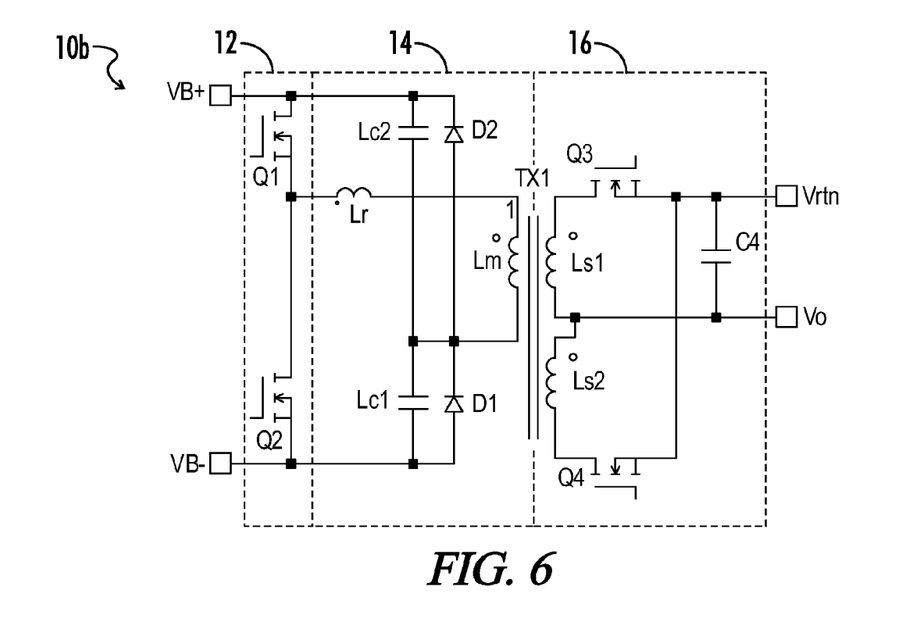
FIG. 6 is a circuit block diagram representing an alternative embodiment of the resonant converter of FIG. 1 having a half-bridge switching converter topology to which an auxiliary resonant parameter may be applied in accordance with the present invention.

Another embodiment of a resonant converter 10b according to the present invention may include a symmetrical half-bridge LLC converter as represented in FIG. 6. A resonant inductor Lr and primary winding Lm of the power transformer TX1 are coupled in series to a node between the switches Q1, Q2. A first capacitor Lc1 and a first diode D1 are coupled in parallel with each other on a first end to the primary winding Lm of the power transformer TX1, and on a second end to the negative input power terminal VB−. A second capacitor Lc2 and a second diode D2 are coupled in parallel with each other on a first end to the primary winding Lm of the power transformer TX1, and on a second end to the positive input power terminal VB+. An auxiliary branch 18 and associated control circuitry as previously described with respect to any one or more of FIGS. 2-5 may be applied in similar fashion with respect to the symmetrical half-bridge topology of FIG. 6.

Figure 7:
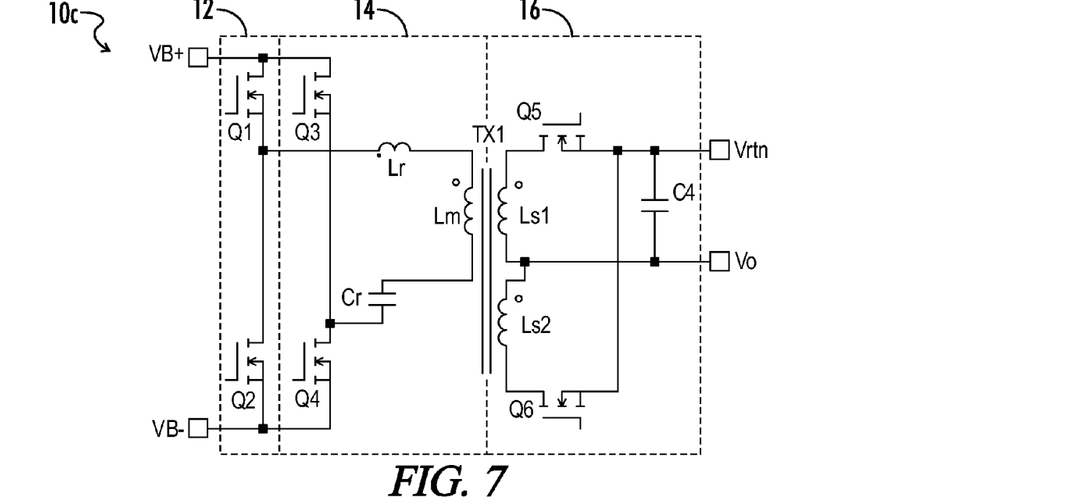
FIG. 7 is a circuit block diagram representing an embodiment of the resonant converter of FIG. 1 having a full-bridge switching converter topology to which an auxiliary resonant parameter may be applied in accordance with the present invention.

Another embodiment of a resonant converter 10c according to the present invention may include a full bridge LLC converter as represented in FIG. 7. The series resonant network 14 (i.e., resonant inductor Lr, magnetizing inductance Lm and resonant capacitor Cr) is coupled on a first end between a first pair of switches Q1, Q2, and coupled on a second end between a second pair of switches Q3, Q4. An auxiliary branch 18 and associated control circuitry as previously described with respect to any one or more of FIGS. 2-5 may be applied in similar fashion with respect to the full bridge topology of FIG. 7.

Figure 8:
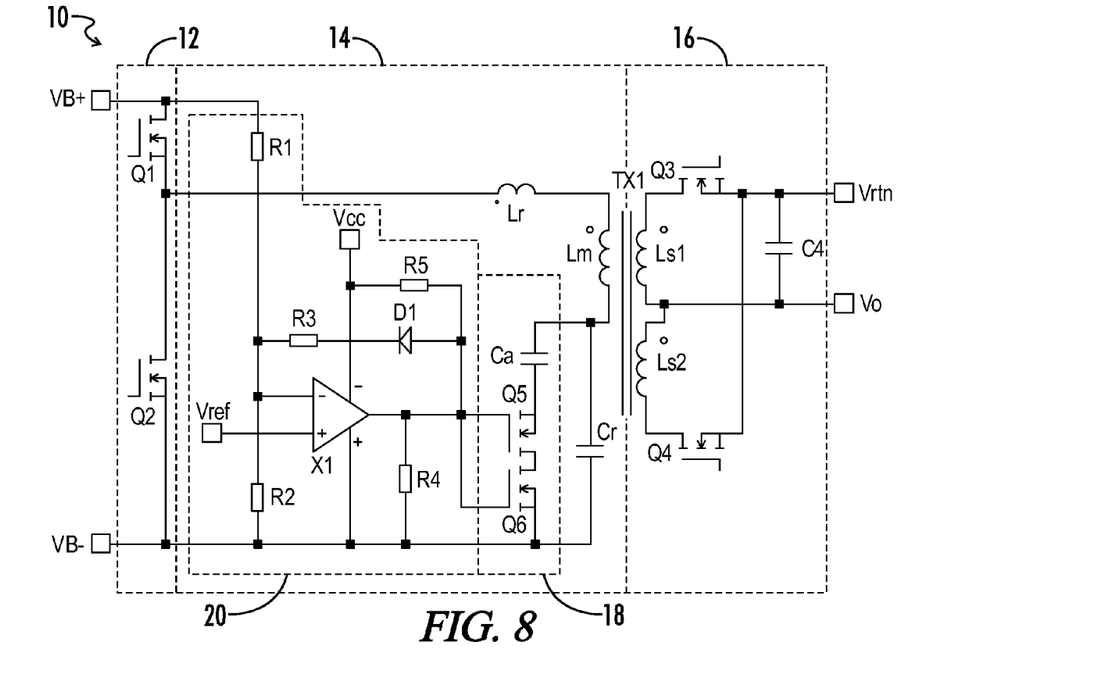
FIG. 8 is a circuit block diagram representing an exemplary embodiment of control circuitry for controllably adjusting resonant parameters.

Referring now to FIG. 8, an exemplary control circuit 20 as applied to a resonant converter 10a such as that represented in FIG. 2 may now be described. It may be understood that an equivalent control circuit 20 may be utilized with respect to various alternative converter topologies, such as for example those resonant converter topologies 10a, 10b, 10c, as represented in FIGS. 3-7, and further that various alternative embodiments of a control circuit 20 may be used, such as for example including microcontrollers rather than or in addition to discrete circuitry.

In the embodiment shown, a comparator X1 is utilized to sense the input voltage and determine when the auxiliary component(s) (e.g., the auxiliary resonant capacitor Ca) is enabled and working in parallel with its respective counterpart in the resonant network 14 (e.g., the resonant capacitor Cr) during a holdup time period. A voltage divider defined by resistors R1 and R2 provides the input voltage to be sensed against the reference voltage Vref. When the input voltage drops to the setting value, the output of the comparator X1 will be changed to high, which can drive both of switches Q5 and Q6 to be turned on. As a result, the auxiliary capacitor Ca is applied to work in parallel with the resonant capacitor Cr. Note that resistor R3 and diode D1 may be included to achieve hysteresis and thereby prevent various glitches in the output of the comparator X1 during any transition operation.

Figure 9:
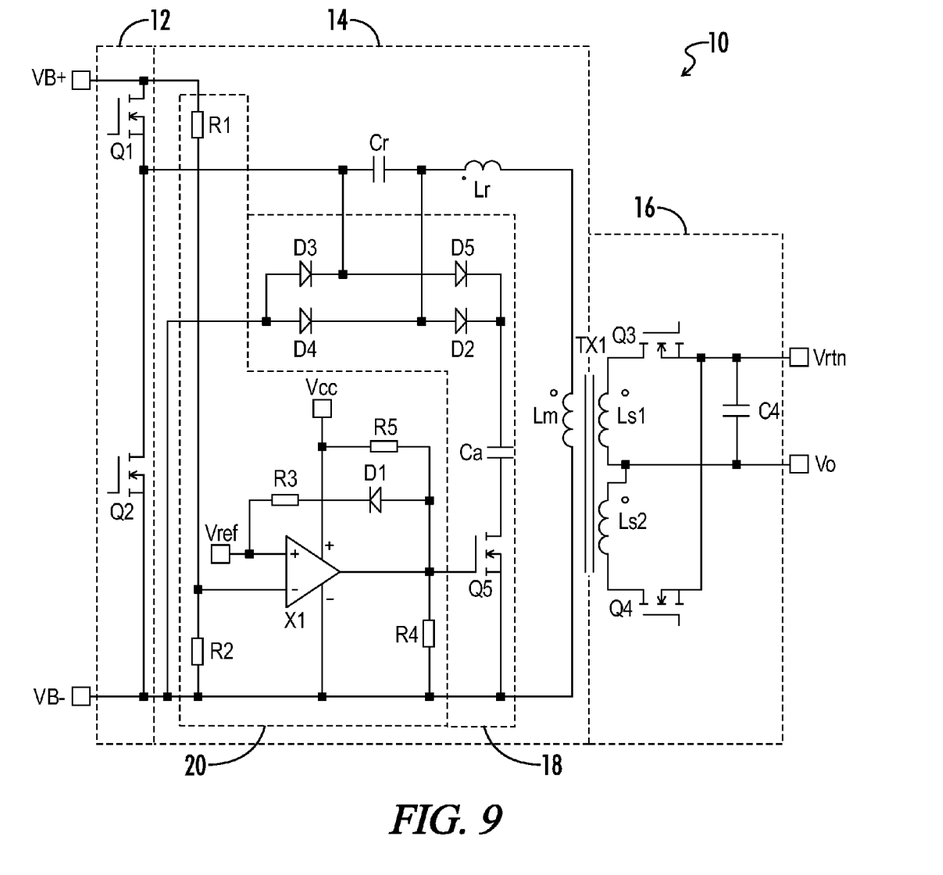
FIG. 9 is a circuit block diagram representing another exemplary embodiment of control circuitry for controllably adjusting resonant parameters.

Referring now to FIG. 9, the exemplary control circuit 20 as described above with respect to FIG. 8 may be applied to circuits having a different embodiment for the auxiliary branch 18. In this case, the auxiliary branch 18 includes a plurality of diodes D2, D3, D4, D5 in addition to the auxiliary capacitor Ca and a single switching element Q5. Note that in FIG. 8, the switching elements Q5 and Q6 are common source connected. The circuit in FIG. 9 may typically be more generic in nature as the resonant capacitor Cr is not connected to power return.

Figure 10:
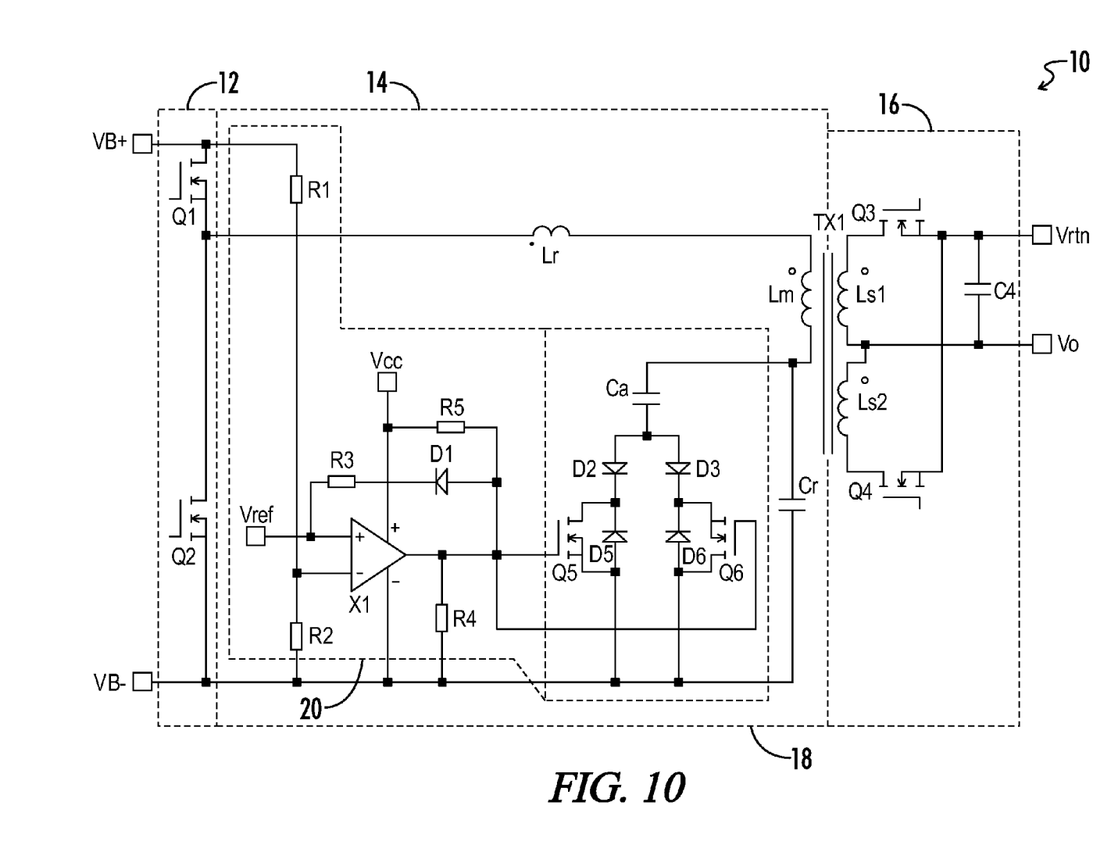
FIG. 10 is a circuit block diagram representing another exemplary embodiment of control circuitry for controllably adjusting resonant parameters.

Referring now to FIG. 10, rather than using a bidirectional switch formed by the series connection of switching elements Q5, Q6 (as represented in FIG. 8), another exemplary embodiment of the auxiliary branch 18 may include first and second switching elements Q5 and Q6, respectively, arranged in a parallel configuration with series blocking body diodes D5 and D6, respectively, to realize an equivalent bidirectional switch.

The switching elements Q5 and Q6 as shown in FIGS. 8-10 are re-channel Mosfets. However, it may be understood that in various embodiments these switching elements may be replaced with p-channel Mosfets or other equivalent units to achieve substantially the same function.

Figure 11:
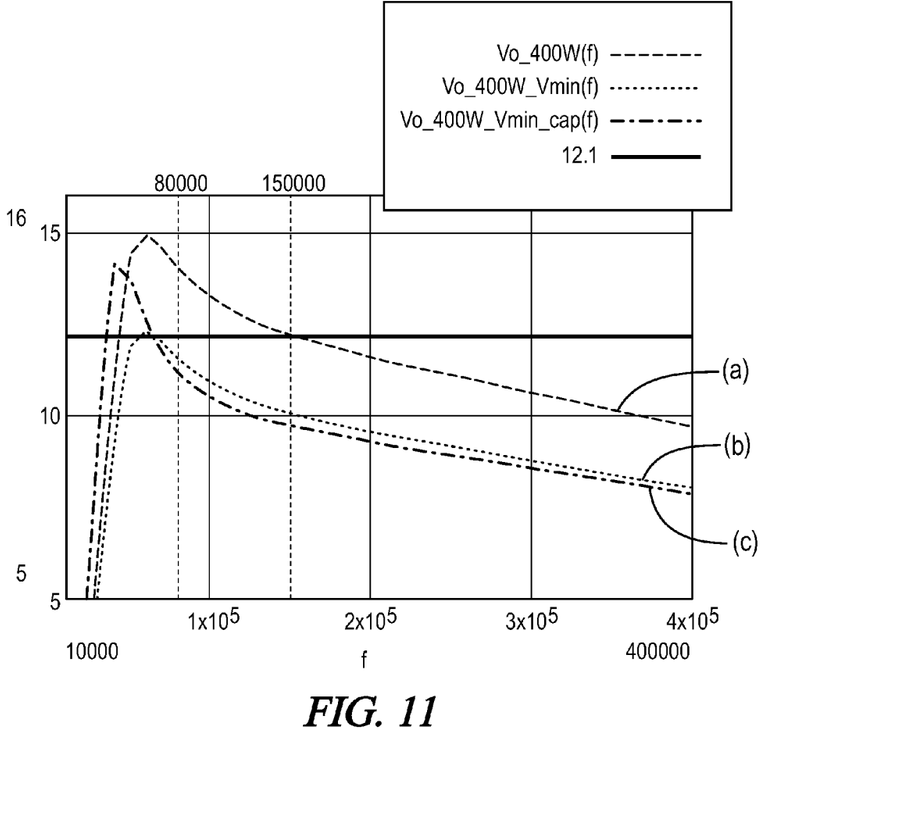
FIG. 11 is a graphical diagram representing performance of an exemplary resonant converter with controllably adjusted resonant capacitance according to a method of the present invention.
Figure 12:
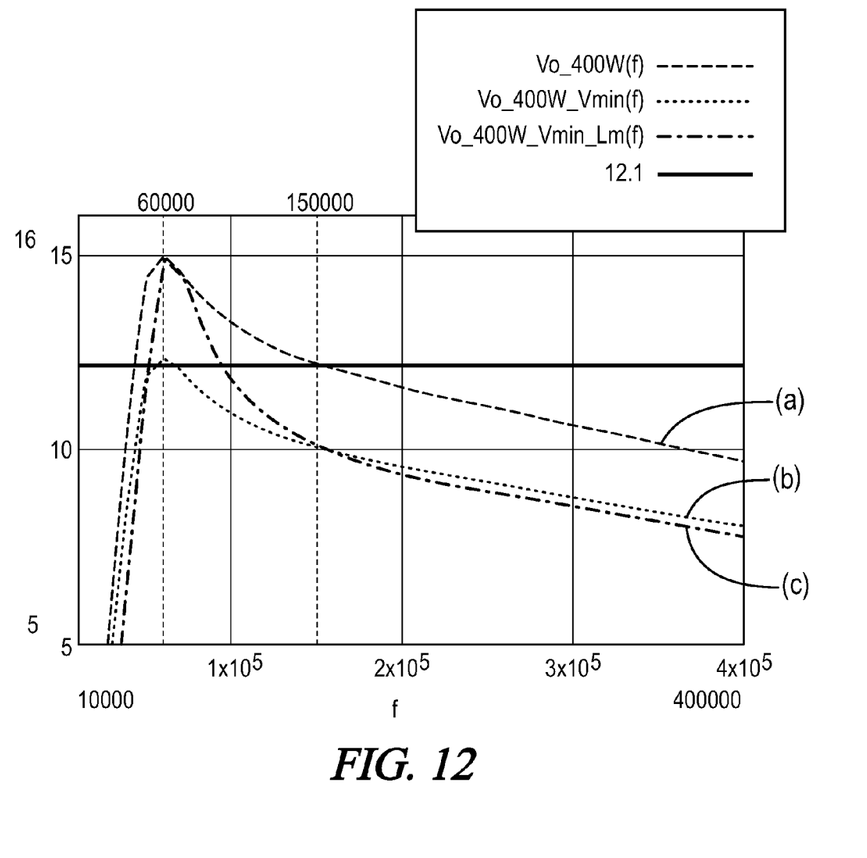
FIG. 12 is a graphical diagram representing performance of an exemplary resonant converter with controllably adjusted magnetic inductance according to a method of the present invention.
Figure 13:
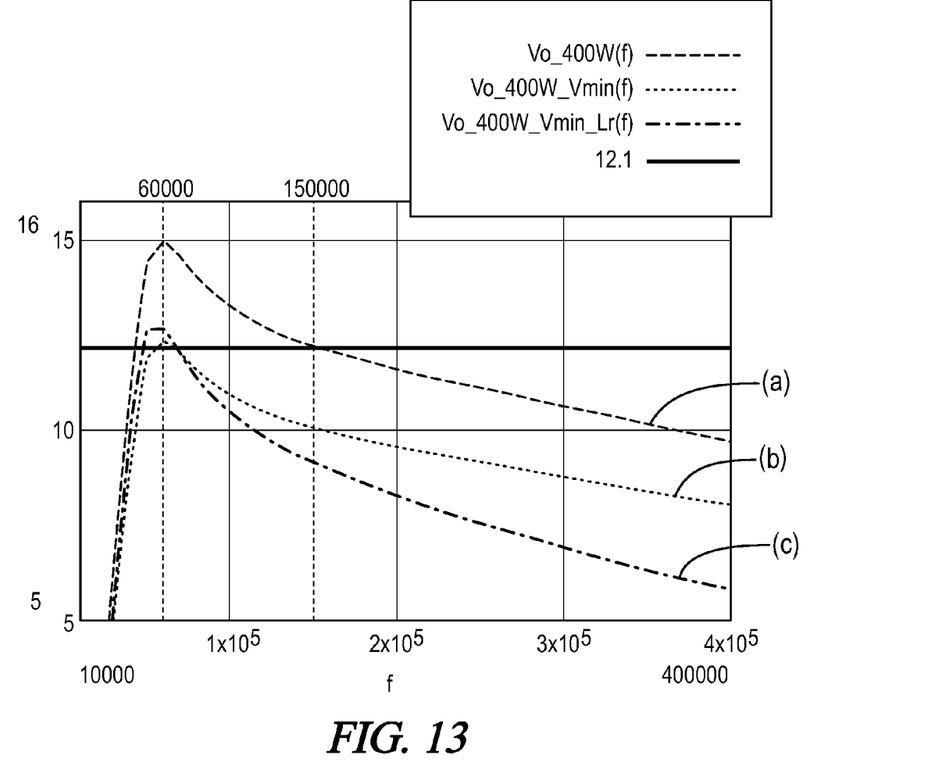
FIG. 13 is a graphical diagram representing performance of an exemplary resonant converter with controllably adjusted resonant inductance according to a method of the present invention.

Referring now to FIGS. 11-13, graphical simulations are provided of exemplary performance of a resonant converter 10 constructed and operated in accordance with the present invention. The simulations were performed based on a 400 W server powered with a single phase half bridge LLC converter. The optimized key parameters include a resonant inductance Lr=24 µH, a resonant capacitance Cr=44 nF, and a magnetizing inductance Lm=274 µH. The resonant frequency is 126 kHz. The nominal bulk voltage is around 400 Vdc. The minimum bulk voltage is 330 Vdc to maintain 12 Vdc regulation.

As represented in the graphs of FIGS. 11-13, a holdup time can be enhanced by application of smaller magnetizing inductance, and/or a larger resonant inductance and/or larger resonant capacitance. In each case shown, only a single component is adjusted, although in certain embodiments it may be understood that some combination of components may be adjusted otherwise.

In FIG. 11, the first curve 11(a) represents the output voltage Vo with a normal bulk voltage of 400 Vdc. The second curve 11(b) represents the output voltage Vo with the normal bulk voltage disabled or removed and an original resonant capacitance of 44 nF at 330 Vdc. The third curve 11(c) represents the output voltage Vo with the resonant capacitance increased by 22 nF to 66 nF, at 330 Vdc. To increase resonant capacitance, a minimum switching frequency has to be reduced synchronously during the hold up time period such that an appropriate gain enhancement is achieved for a longer hold up time.

In FIG. 12, the first curve 12(a) represents the output voltage Vo with a normal bulk voltage of 400 Vdc. The second curve 12(b) represents the output voltage Vo with the normal bulk voltage disabled or removed and an original magnetizing inductance of 274 µH at 330 Vdc. The third curve 12(c) represents the output voltage Vo with the magnetizing inductance decreased to 175 µH, at 330 Vdc. To decrease the magnetizing inductance, it is unnecessary to adjust the minimum switching frequency during the hold up time period.

In FIG. 13, the first curve 13(a) represents the output voltage Vo with a normal bulk voltage of 400 Vdc. The second curve 13(b) represents the output voltage Vo with the normal bulk voltage disabled or removed and an original resonant inductance of 24 µH at 330 Vdc. The third curve 13(c) represents the output voltage Vo with the resonant inductance increased to 45 µH, at 330 Vdc. The minimum switching frequency as represented in FIG. 13 remains substantially unchanged during the hold up time, but the improvement is somewhat limited.

The previous detailed description has been provided for the purposes of illustration and description. Thus, although there have been described particular embodiments of the present invention of a new and useful "Resonant Converter with Auxiliary Resonant Components and Holdup Time Control Circuitry," it is not intended that such references be construed as limitations upon the scope of this invention except as set forth in the following claims.

What is claimed is:

1. A resonant power converter comprising:
an input power conversion switching circuit comprising a plurality of power conversion switches coupled to a line voltage input to the power converter;
a series resonant circuit coupled to an output side of the power conversion switching circuit and comprising a resonant inductance circuit, a resonant capacitance circuit, and a magnetizing inductance circuit;
wherein at least one of the resonant inductance circuit, the resonant capacitance circuit, and the magnetizing inductance circuit in the series resonant circuit further comprise at least first and second circuit branches and a switch controllable to regulate an inductance or capacitance value corresponding to the respective circuit; and
a control circuit effective to
detect a holdup time condition associated with a line voltage failure, and
generate control signals to adjust a switch state for the switch in the series resonant circuit in accordance with determining a first operating mode associated with the holdup time condition or a second operating mode associated with normal operation of the converter.

2. The resonant power converter of claim 1 wherein the resonant inductance circuit comprises:
a second resonant inductor;
a switch coupled across a first resonant inductor; and
the resonant inductance circuit comprises a first resonant inductance in the first mode and a second resonant inductance in the second mode.

3. The resonant power converter of claim 1 wherein the resonant capacitance circuit comprises:
a second resonant capacitor;
a switch coupled across a first resonant capacitor; and
the resonant capacitance circuit comprises a first resonant capacitance in the first mode and a second resonant capacitance in the second mode.

4. The resonant power converter of claim 1 wherein the magnetizing inductance circuit comprises:
a first magnetizing inductor coupled in parallel with a primary winding of a power transformer;
a second magnetizing inductor and a switch coupled across the first magnetizing inductor; and
the magnetizing inductance circuit comprises a first magnetizing inductance in the first mode and a second magnetizing inductance in the second mode.

5. The resonant power converter of claim 1 wherein the magnetizing inductance circuit comprises:
a first magnetizing inductance associated with a primary winding of a power transformer;
a second magnetizing inductance associated with a magnetizing inductor, the magnetizing inductor and a switch coupled across the primary winding of the power transformer; and
the magnetizing inductance circuit comprises a first resonant inductance in the first mode and a second resonant inductance in the second mode.

6. The resonant power converter of claim 1, wherein the control circuit is effective to maintain the first mode in accordance with continued detection of the holdup time condition.

7. The resonant power converter of claim 1 wherein, the control circuit is effective to maintain the first mode in accordance with a predetermined holdup time value.

8. A resonant power converter comprising:
a pair of input terminals effective to receive input power from a power source;
an input power conversion switching circuit comprising a plurality of power conversion switches coupled to the input terminals and an output side;
a series resonant circuit coupled to the output side of the input power conversion switching circuit and comprising a resonant inductance, a resonant capacitance, a magnetizing inductance and at least one switch having first and second switch states associated with first and second values for a corresponding one or more of said resonant inductance, resonant capacitance and magnetizing inductance;
a feedback circuit coupled to the pair of input terminals and effective to generate output signals representative of the input power;
a control circuit effective to
receive the output signals from the feedback circuit,
compare an amplitude of the output signals from the feedback circuit to a predetermined threshold,
determine a holdup time condition or a normal condition wherein the amplitude of the output signals from the feedback circuit is below or above the threshold, and
generate control signals to turn on and off the least one switch based on the determination.

9. The resonant power converter of claim 8, the series resonant circuit comprising a first resonant inductor and the switch coupled in series with a second resonant inductor across the first resonant inductor, and
wherein the resonant inductance comprises a first resonant inductance value when the switch is in the first state and a second resonant inductance value when the switch is in the second state.

10. The resonant power converter of claim 8, the series resonant circuit comprising a first resonant capacitor and the switch coupled in series with a second resonant capacitor across the first resonant capacitor, and
wherein the resonant capacitance comprises a first resonant capacitance value when the switch is in the first state and a second resonant capacitance value when the switch is in the second state.

11. The resonant power converter of claim 8, the series resonant circuit comprising a first magnetizing inductor coupled in parallel with a primary winding of a power transformer, and the switch coupled in series with a second magnetizing inductor across the first magnetizing inductor, and
wherein the magnetizing inductance comprises a first magnetizing inductance when the switch is in the first state and a second magnetizing inductance when the switch is in the second state.

12. The resonant power converter of claim 8, the series resonant circuit comprising a primary winding of a power transformer, and the switch coupled in series with a magnetizing inductor across the primary winding of the power transformer,
wherein the magnetizing inductance comprises a first magnetizing inductance value when the switch is in the first state and a second magnetizing inductance value when the switch is in the second state.

13. The resonant power converter of claim 8, wherein the control circuit is effective upon determining a holdup time condition to maintain the at least one switch in the first state while the amplitudes of the output signals from the feedback circuit remain below the predetermined threshold.

14. The resonant power converter of claim 8, wherein the control circuit is effective upon determining a holdup time condition to maintain the at least one switch in the first state for a predetermined holdup time duration.

15. A method of gain enhancement in a resonant power converter having a resonant inductance, a resonant capacitance and a magnetizing inductance, the method comprising:
   monitoring signals representative of a line voltage input to the resonant power converter;
   comparing an amplitude of the representative signals to a predetermined reference voltage;
   determining a holdup time condition in accordance with a line voltage input falling below the predetermined reference voltage; and
   adjusting one or more of the resonant inductance, the resonant capacitance and the magnetizing inductance from a first value to a second value upon determining the holdup time condition.

16. The method of claim 15, the resonant power converter comprising a first resonant inductor providing the resonant inductance during a normal operation of the converter, and wherein
   the step of adjusting one or more of the resonant inductance, the resonant capacitance and the magnetizing inductance from a first value to a second value upon determining the holdup time condition comprises switchably coupling a second resonant inductor across the first resonant inductor upon determining the holdup time condition to adjust the resonant inductance from the first value to the second value.

17. The method of claim 15, the resonant power converter comprising a first resonant capacitor providing the resonant capacitance during a normal operation of the converter; and wherein
   the step of adjusting one or more of the resonant inductance, the resonant capacitance and the magnetizing inductance from a first value to a second value upon determining the holdup time condition comprises switchably coupling a second resonant capacitor across the first resonant capacitor upon determining the holdup time condition to adjust the resonant capacitance from the first value to the second value.

18. The method of claim 15, the resonant power converter comprising a first magnetizing inductor coupled across a primary winding of a power transformer and providing the magnetizing inductance during a normal operation of the converter, and wherein
   the step of adjusting one or more of the resonant inductance, the resonant capacitance and the magnetizing inductance from a first value to a second value upon determining the holdup time condition comprises switchably coupling a second magnetizing inductor across the first magnetizing inductor upon determining the holdup time condition to adjust the magnetizing inductance from the first value to the second value.

19. The method of claim 15, the resonant power converter comprising a primary winding of a power transformer as providing the magnetizing inductance during a normal operation of the converter, and wherein
   the step of adjusting one or more of the resonant inductance, the resonant capacitance and the magnetizing inductance from a first value to a second value upon determining the holdup time condition comprises switchably coupling a magnetizing inductor across the primary winding of the power transformer upon determining the holdup time condition to adjust the magnetizing inductance from the first value to the second value.

20. The method of claim 15, further comprising the step of adjusting the one or more of the resonant inductance, the resonant capacitance and the magnetizing inductance from the second value to the first value after a predetermined holdup time duration.

* * * * *